United States Patent [19]

Feuillalay

[11] Patent Number: 4,565,122
[45] Date of Patent: Jan. 21, 1986

[54] COOKING UTENSIL HAVING CHAMBER BENEATH PERFORATED COOKING SURFACE

[76] Inventor: Jean P. Feuillalay, Anneville Ambourville Duclair (Seine Maritime), France

[21] Appl. No.: 559,960

[22] Filed: Dec. 9, 1983

[51] Int. Cl.⁴ .................. A47J 37/00; A47J 29/06
[52] U.S. Cl. ........................... 99/447; 99/440; 99/450; 126/390
[58] Field of Search ............ 99/401, 422, 447, 450, 99/425; 126/390

[56] References Cited

U.S. PATENT DOCUMENTS 2,027,296  1/1936  Stuart .......................... 99/450 X
4,352,324  10/1982  Noh ............................. 99/425

FOREIGN PATENT DOCUMENTS 815631  7/1937  France ........................... 99/425
422378  1/1935  United Kingdom ............. 99/447

Primary Examiner—Billy J. Wilhite
Attorney, Agent, or Firm—Louis Orenbuch

[57] ABSTRACT

A cooking utensil utilizes a flat heating surface having in it a multitude of holes whose diameters are in the 1.5 to 3 mm. range. The holes are distributed over the heating surface and open into a chamber beneath the cooking surface. The chamber is formed by a collar that extends downwardly from the periphery of the cooking surface. The collar acts as a chimney that causes the hot gases to rise through the holes in the cooking surface and permeate the food with the aroma of the fuel, which may be wood chips, charcoal, or other substances that lend a distinct odor to food.

1 Claim, 5 Drawing Figures

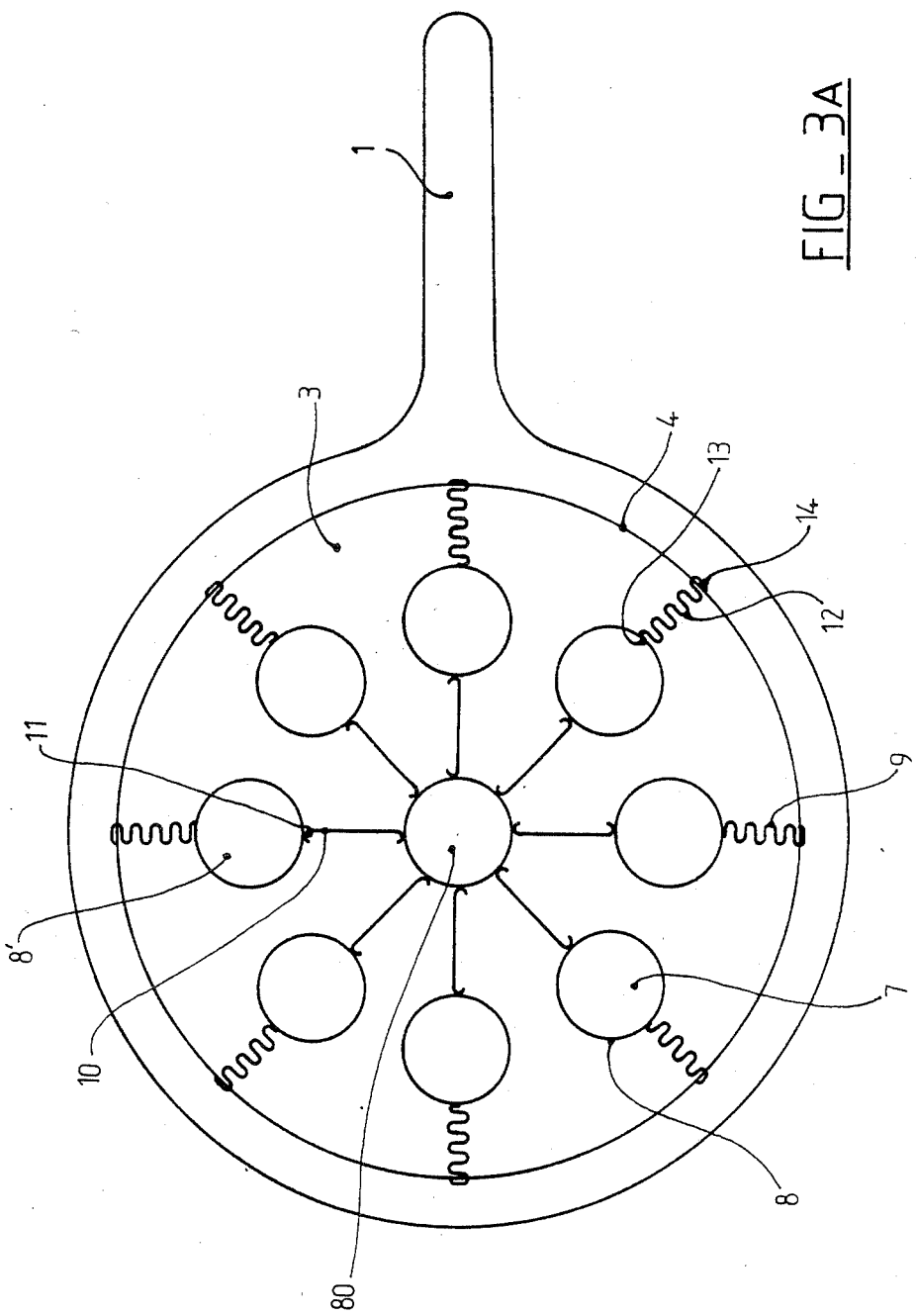
FIG_3A

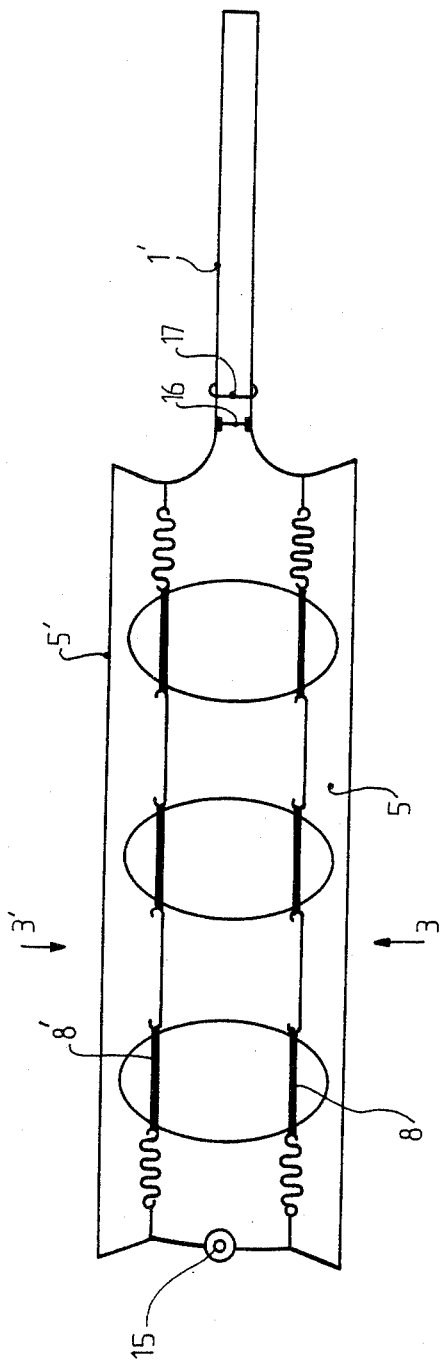
FIG_4

COOKING UTENSIL HAVING CHAMBER BENEATH PERFORATED COOKING SURFACE

This invention relates to a cooking utensil, more particularly a saucepan or frying pan, adapted more particularly for use on a naked-flame heat source, such as a gas cooker, a barbecue or an open fire.

The oil crisis during the past ten years has led to an increasing demand for maximum energy savings in view of the increasingly high cost, an accompanying effect being an increased use of natural products as energy sources.

This general trend has led to natural and economic products ranging from the most sophisticated, such as windmills using wind energy, or solar-heated houses, to the most elementary gadgets.

In keeping with this trend this invention relates to a cooking utensil, more particularly a saucepan or frying pan, which gives energy savings when used on conventional type cookers, such as gas cookers, and alternative embodiments of which enable different types of cooking to be carried out very easily on open fires, particularly on a barbecue or a fire.

The cooking utensil according to the invention is characterised in that it comprises a handle, an upper rim if required, and a cooking surface, the periphery of which is provided with a collar made of a material which is a heat conductor, and more particularly sheet-metal, which flares out in the downward direction and the bottom edge of which forms the surface by which the cooking utensil is supported on the heat source, more particularly the metal grill of a gas cooker or a barbecue, or directly on an open fire. The collar thus to some extent acts as a means of concentrating the heat on the cooking surface and thus gives appreciable energy savings.

Of course the cooking utensil may be in any form without departing from the scope of the invention and may, for example, be in the form of a saucepan, a frying pan, sauteing pan, casserole, and so on.

The main feature of this utensil, therefore, is the presence of the collar, which can be fitted to the cooking surface in any manner (by welding, riveting, etc.), the dimensions and shape thereof depending on the required purpose.

The most frequent configuration will be a circular cooking surface associated with a frusto-conical collar. Appropriate selection of the dimensions of the bottom diameter of the collar enables the utensil also to be used effectively on an electric cooker.

Consequently, the utensil according to the invention is in its simplest form a conventional saucepan or frying pan bearing a collar acting as a means of concentrating the heat at the bottom. In that case, the cooking surface is simply in the form of a sheet of thermally conductive material, more particularly a metal.

According to a first variant of the invention, the cooking surface sheet is formed with perforations, which are in the form of holes, e.g. circular holes, of a diameter of between about 1.5 and 3 mm, which are more particularly staggered.

A utensil of this kind is adapted for use on a barbecue or on a fire, where it can be placed directly on the open fire to provide very simple and economic cooking of grilled foods, fish, vegetables, etc.

Surprisingly, if the diameter of the holes is of the order of 2.5 mm, it is quite possible to cook fried eggs while holes of the order of 1.80 mm enable crepes to be grilled without any risk of the mixture running on to the fire. In all these cases the food cooked in this way has a special and particularly pleasant flavour.

According to a second variant of the invention, the cooking utensil is provided with a cooking surface formed with circular apertures. A utensil of this kind is intended for cooking hard or soft eggs on an open fire to enable them to take on a smoky flavour which is also very pleasant.

According to the preferential configuration of this second variant, the circular apertures are defined by preferably metal rings interconnected and/or connected to the top edge of the collar which is not intended to be directly in contact with the heat source, by means of preferably metal connecting rods. In that case, the assembly comprising the rings, connecting rods and the top edge of the collar form the cooking surface.

According to the invention, the cooking surface of a utensil of this kind can simply be in the form of a central ring surrounded by any number of peripheral rings, the central ring being connected to each of the peripheral rings by a rigid connecting rod while each of the peripheral rings is also connected to the top edge of the collar by a rigid connecting rod or by a connecting rod acting as a spring.

According to the invention, the connecting rods may be either fixed or detachable.

According to another feature of such a utensil, the ends of the rigid connecting rods are hook-shaped and one of the ends of the connecting rods form of a spring is also hook-shaped while the other end is secured to the top edge of the collar preferably by welding.

With this arrangement, the number of rings corresponding to the number of eggs actually required to be cooked can be fitted to the collar just at the last moment.

Despite these advantages, a cooking utensil of this kind nevertheless has disadvantages because the eggs are not held effectively and there are therefore risks of breakage when they are removed and introduced. Also, since it is always the same side by which they rest on the heat source there is the possibility of the eggs not being cooked uniformly.

To this end, the invention also relates to a utensil providing uniform cooking of the eggs corresponding an improvement to the utensils according to the second variant described hereinbefore.

A utensil of this kind is characterised in that it comprises a lid consisting of a second handle identical to the first handle, a second cooking surface identical to the first cooking surface, and a second collar identical to the first collar, said lid being connected to the utensil by means of a hinge and being displaceable between an open position for the introduction of the eggs for cooking and a cooking position in which it is pivoted above the cooking utensil to hold each egg between two identical rings.

This device which, therefore, actually consists of two devices of the second variant situated one above the other and connected by a hinge, enables the above-mentioned disadvantages to be obviated, the eggs being rigidly held therein without any risk of breakage while the device can easily be turned over to give uniform cooking of the eggs.

According to another characteristic of the invention, this device comprises a stop enabling the two handles to be kept a certain distance apart in the cooking position, and a locking pin enabling the handle to be secured in said position. The object of these latter means is to facilitate the operation of turning the utensil over during cooking.

The characteristics of the cooking utensil according to the invention will be described in greater detail with reference to the accompanying drawings wherein:

FIGS. 3A and 3B are top plan views of the cooking surface of two possible configurations of a utensil according to other variants of the invention.

FIG. 4 is a section of a device according to the FIG. 3A variant of the invention.

Figure 1:
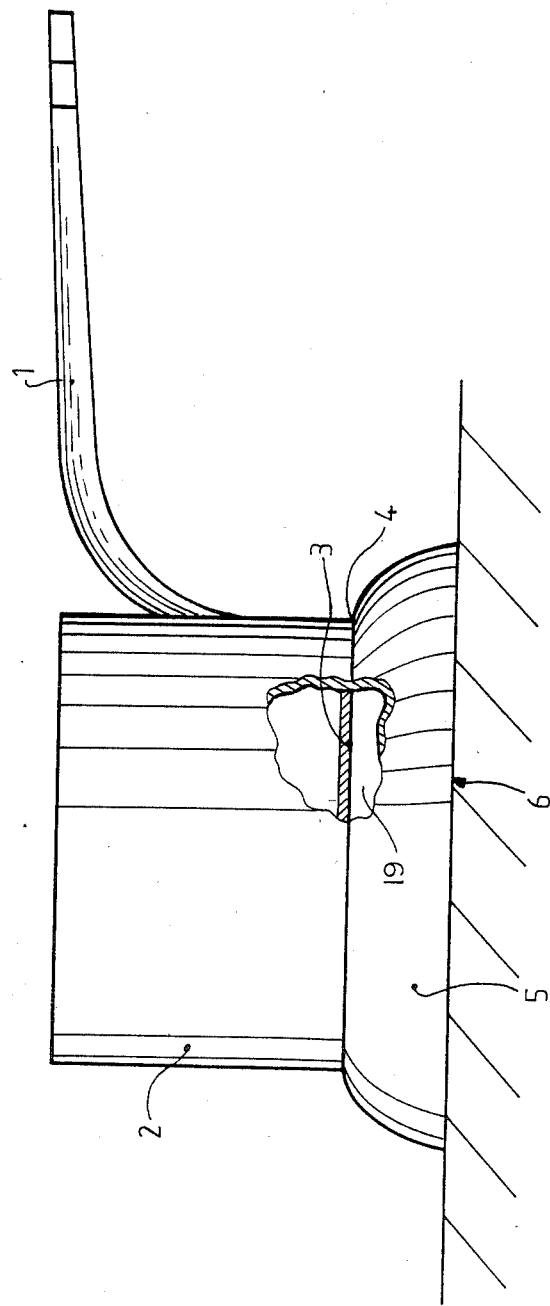
FIG. 1 is an illustration of the simplest embodiment of the cooking utensil according to the invention.

Referring to FIG. 1, the cooking utensil, more particularly the saucepan or frying pan according to the invention, comprises a handle 1, a top rim 2 and a cooking surface 3, the periphery 4 of which bears a collar 5 of a thermally conductive material, more particularly sheet metal, which flares out in the downward direction and the bottom edge 6 of which forms the surface by which the cooking utensil bears on the heat source (not shown) which may be the metal grill of a gas cooker or of a barbecue. According to the invention, the cooking utensil can also rest directly on the open fire. The collar 5 therefore to some extent acts as a means of concentrating the heat from the heat source on the cooking surface 3 by forming a chamber 19 beneath that cooking surface.

Although the cooking surface 3 and the collar 5 may be of any shape and dimensions, they will generally respectively be in the form of a circle and of frusto-conical shape.

The height of the collar 5, i.e. the difference between its bottom edge 6 and its top edge 4, may also have any dimensions but a size of the order of 2.5 cm has proved to give particularly satisfactory results as regards energy savings.

Figure 2:
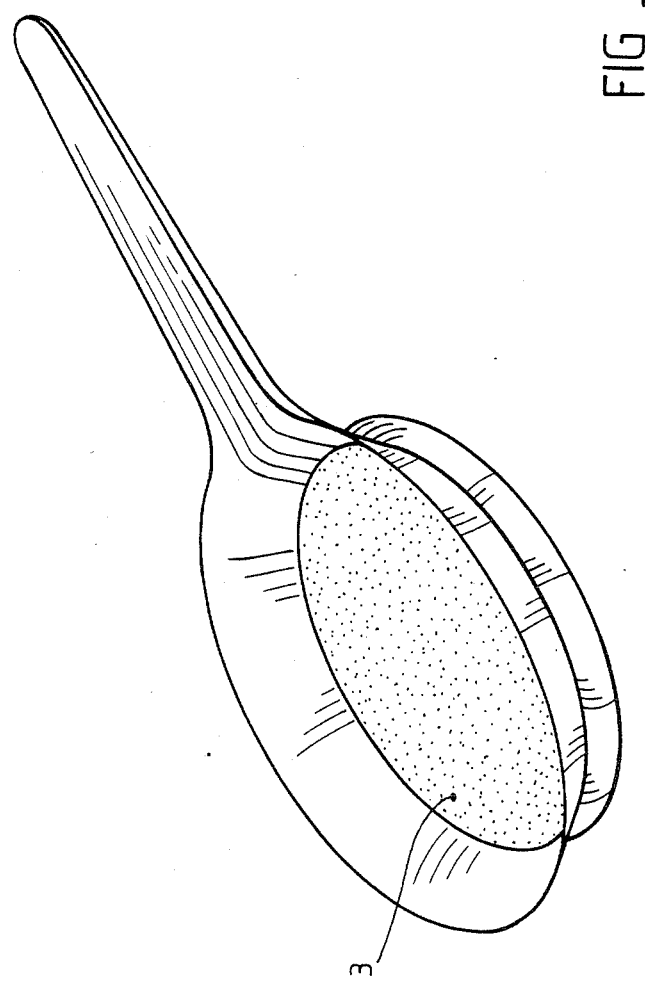
FIG. 2 is a perspective view of a cooking utensil that is a variant of the FIG. 1 embodiment.

While the cooking surface 3 in FIG. 1 is simply in the form of a sheet of thermally conductive material, more particularly a metal, the frying pan shown in FIG. 2 has the cooking surface in the form of a perforate plate 18, the circular holes of which are staggered and are of a diameter of between about 1.5 and 3 mm.

As already stated above, this first variant of the invention is intended for the cooking of grilled foods, fish, fried eggs etc., on an open fire so as to give them a particularly pleasant taste.

The collar 5 in both FIG. 1 and FIG. 2 may be secured to the cooking surface sheet by any conventional means, more particularly welding, riveting etc.

Figure 3B:
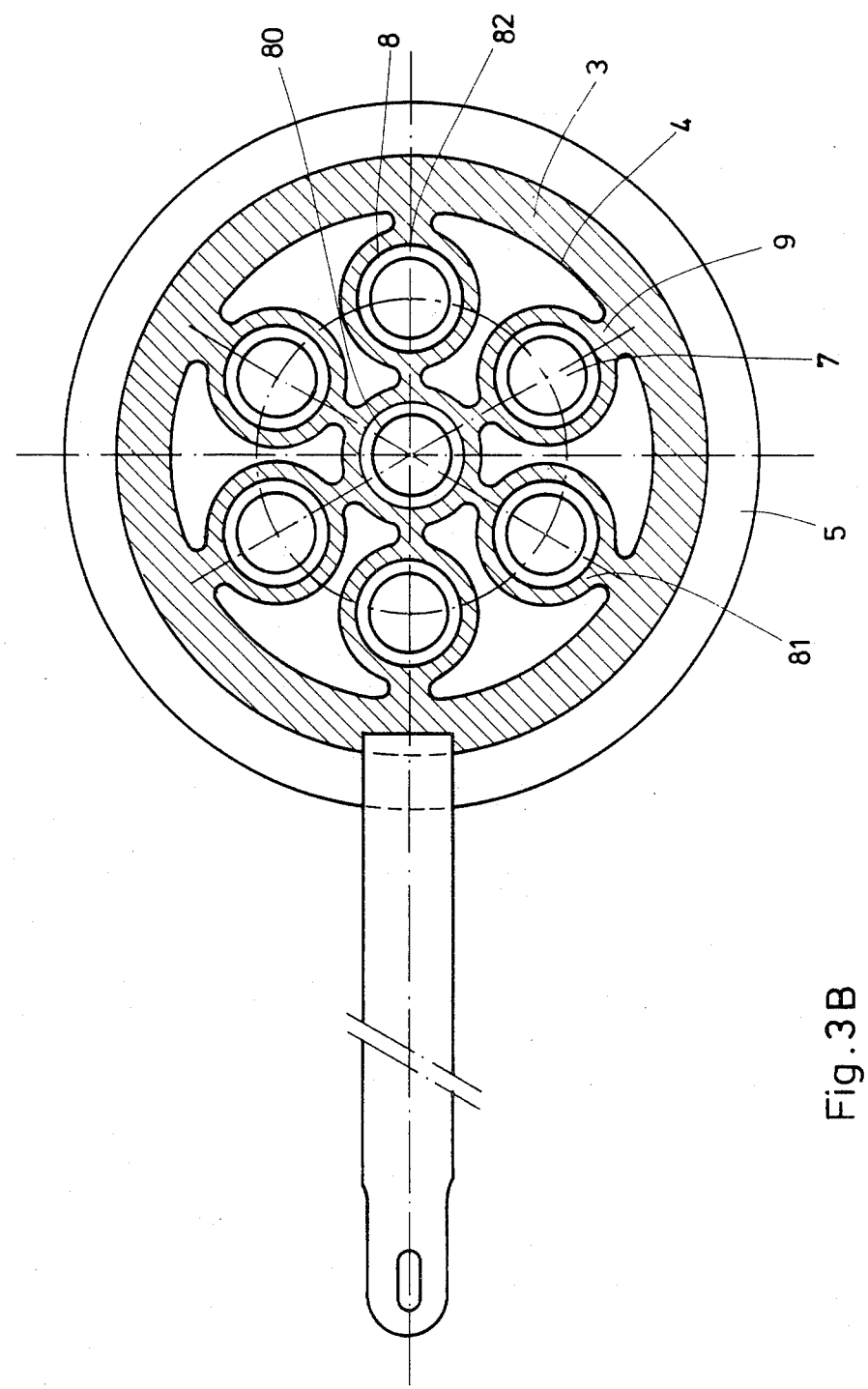

Referring to FIGS. 3A and 3B, the cooking surface is formed with circular apertures 7 adapted to receive eggs for hard or soft cooking. The apertures 7 are defined by preferably metal rings 8 interconnected and/or connected to the top edge 4 of the collar 5 not intended to be directly in contact with the heat source, by means of preferably metal connecting rods 9. The assembly comprising the rings 8, connecting rods 9 and top edge 4 of the collar 5 form the cooking surface 3 in this variant.

Referring to FIGS. 3A and 3B, the rings are in the form of a central ring 80 surrounded by peripheral rings 81, eight of which are shown in the drawings although any number could be provided.

Referring to FIG. 3A, the central ring 80 is connected to each of the peripheral rings 81 by a rigid connecting rod 10, the ends 11 of which are bent to be hook-shaped for their ready securing on the rings 80 or 81. Each of the peripheral rings 81 is also connected to the top edge 4 of the collar 5 by a connecting rod 12 which acts as a spring and of which one also hook-shaped end 13 enables it to be secured to a ring 81 while its other end 14 is secured to the top edge 4 of the collar 5 preferably by welding.

Referring to FIG. 3B, the rings 8, connecting rods 9 and top edge 4 of the collar 5 form an integral geometric pattern, the solid zones of which are shown by cross-hatching.

This configuration has the advantage of being much more rigid than that shown in FIG. 3A. Also, to improve the stability of the eggs once they are in position, the rings 8 are all provided with conical collars 82 which taper in the downward direction so as to define a similar volume to that of an eggcup.

Of course the rods 9, 10, 12 and the rings 8, 80, 81 may be of different shapes without thereby departing from the scope of the invention.

FIG. 4 shows two similar devices to that shown in FIG. 3A connected by a hinge 15. This utensil comprises two identical handles 1, 1', two identical collars 5, 5' and two identical cooking surfaces 3, 3' identical to that shown in FIG. 3A. The elements 1', 3', 5' (or 3, 5, 1) form a lid which can be moved between an open position (not shown) for introduction of the eggs for cooking, and a cooking position (shown in FIG. 4), in which it is pivoted to hold each egg in two identical rings 8, 8'. This device can therefore be turned fully over this obviating the disadvantages due to the risk of breakage or non-uniform cooking of the eggs. To enable the whole system to be held in the cooking position and facilitate its turning over, a stop 16 is provided to hold the two handles 1, 1' a certain distance apart in the cooking position, and a locking pin 17 to secure the handles in that position.

I claim:
1. A cooking utensil comprising
   (i) a plate having a substantially flat cooking surface
   (ii) means forming a wall surrounding the cooking surface and extending upwardly therefrom,
   (iii) means forming a collar extending downwardly from the periphery of the cooking surface, the collar forming a chamber beneath the cooking surface for enabling positive pressure to be established in the chamber by the confinement of hot gases,
   (iv) the cooking surface having many small holes therethrough which open into the chamber beneath the cooking surface and which cooperate with the collar to form a chimney, the small holes being distributed over the area of the cooking surface, and the diameters of those holes being in the 1.5 to 3 mm range.

* * * * *